United States Patent
Barvosa-Carter et al.

(10) Patent No.: US 7,108,316 B2
(45) Date of Patent: Sep. 19, 2006

(54) ENERGY ABSORBING ASSEMBLY UTILIZING REVERSIBLY EXPANDABLE MECHANICAL STRUCTURES FOR IMPACT MANAGEMENT AND METHODS FOR OPERATING THE SAME

(75) Inventors: William Barvosa-Carter, Ventura, CA (US); Nancy L. Johnson, Northville, MI (US); Alan L. Browne, Grosse Pointe, MI (US); Geoffrey P. Mc Knight, Los Angeles, CA (US); Cameron Massey, Hawthorne, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/918,740

(22) Filed: Aug. 13, 2004

(65) Prior Publication Data

US 2006/0033362 A1    Feb. 16, 2006

(51) Int. Cl.
*B60R 21/04* (2006.01)
(52) U.S. Cl. .................. 296/187.05; 280/751
(58) Field of Classification Search ............ 296/187.03–187.05; 280/751
See application file for complete search history.

(56) References Cited

U.S. PATENT DOCUMENTS

| | | |
|---|---|---|
| 3,806,154 A | 4/1974 | Akiyama |
| 4,044,358 A | 8/1977 | Manning et al. |
| 4,389,961 A | 6/1983 | Parish |
| 5,306,066 A | 4/1994 | Saathoff |
| 5,382,051 A | 1/1995 | Glance |
| 5,433,478 A | 7/1995 | Naruse |
| 5,445,430 A | 8/1995 | Nichols |
| 5,454,589 A | 10/1995 | Bosio et al. |
| 5,549,327 A | 8/1996 | Rusche et al. |
| 5,752,717 A | 5/1998 | Galbraith et al. |
| 5,794,975 A | 8/1998 | Nohr et al. |
| 5,839,756 A | 11/1998 | Schenck et al. |
| 6,102,436 A | 8/2000 | Bayley et al. |
| 6,120,862 A | 9/2000 | Aouad et al. |
| 6,170,871 B1 * | 1/2001 | Goestenkors et al. .... 280/743.1 |
| 6,193,272 B1 * | 2/2001 | Aigner et al. ............ 280/730.1 |
| 6,193,303 B1 * | 2/2001 | Urushiyama et al. .. 296/187.03 |
| 6,213,548 B1 | 4/2001 | Van Wynsberghe et al. |
| 6,619,689 B1 | 9/2003 | Spencer et al. |
| 6,910,714 B1 * | 6/2005 | Browne et al. ............. 280/753 |
| 2001/0045762 A1 | 11/2001 | von Holst et al. |
| 2003/0075953 A1 | 4/2003 | Hirota et al. |

FOREIGN PATENT DOCUMENTS

JP          5-24494      *  2/1993

* cited by examiner

*Primary Examiner*—Dennis H. Pedder
(74) *Attorney, Agent, or Firm*—Kathryn A. Marra

(57) ABSTRACT

Reversibly deployable energy absorbing assemblies for impact management generally include a translatable first element, a rigid support structure and a second element having one end fixedly attached to the rigid support structure and an other end fixedly attached to the translatable first element. The second elements are adapted to plastically deform along a predefined buckling path. The predefined buckling path may be uni-modal or multi-modal depending on the desired application and/or impact conditions. Also disclosed herein are methods for operating the energy absorbing assemblies.

18 Claims, 5 Drawing Sheets

ENERGY ABSORBING ASSEMBLY UTILIZING REVERSIBLY EXPANDABLE MECHANICAL STRUCTURES FOR IMPACT MANAGEMENT AND METHODS FOR OPERATING THE SAME

BACKGROUND

This disclosure relates to a deployable energy absorbing assembly and more particularly, to an energy absorbing assembly for impact management.

It is known in the prior art to provide various types of personal protection by the use of energy-absorbing devices, such as in helmets, vehicles, and the like. These products are generally designed to absorb a significant percentage of the energy from an impact. Within the vehicle, for example, various types of occupant protection devices may be employed for impact with structural body components such as door pillars, frames, headrails and the like. These components are typically made of steel tubing or steel channels that are welded together to form the structural cage or unitized body for the vehicle and may themselves absorb energy as the result of an impact. In addition, energy absorbers may also be placed over the door pillars, frames, headrails, and other parts of the vehicle to further protect the vehicle occupants during an impact event. Prior art approaches generally have used irreversibly crushable materials, such as metal, plastics or foams, irreversible air inflation devices, e.g. air bags and inflatable side curtains, rigid translation devices, e.g., extendable/retractable knee bolsters, and devices that can change the stroking forces, e.g., magnetorheological material based dampers.

Nevertheless, there still remains a need for improved energy absorbing assemblies

BRIEF SUMMARY

Disclosed herein are deployable energy absorbing assemblies and methods for operating the energy absorbing assemblies. In accordance with one embodiment, a reversibly deployable energy absorbing assembly, comprises a first element; a rigid support structure, wherein the first element is translatable relative to the rigid support structure, and wherein the first element is spaced apart from and substantially parallel to the rigid support structure; at least one second element having one end fixedly attached to the first element and an other end fixedly attached to the rigid support structure, wherein the second element is fabricated from a material adapted to release elastic energy along an unbuckling path from a curvilinear shape orientation to a substantially straight shape orientation during expansion, and upon compression, a multi-modal buckling path from the substantially straight shape orientation to the curvilinear shape orientation; and a releasable locking mechanism in operative communication with the first element and the rigid support structure.

In another embodiment, an energy absorbing assembly comprises a rigid support structure comprising a member disposed on a surface of the rigid support structure; a first element spaced apart from and substantially parallel to the rigid support structure, wherein the first element comprises a first element member disposed on a surface and positioned to lockingly engage the rigid support structure member when the energy absorbing assembly is in a deployed configuration; a plurality of second elements fixedly attached to the rigid support structure and the first element, the plurality of second elements having a curvilinear shape orientation in a stowed configuration and a linear configuration in the deployed configuration; and releasable locking means for providing the stowed and deployed configurations.

In a process of operating an energy absorbing assembly, the process comprises attaching the energy absorbing assembly to a rigid support structure, wherein the energy absorbing assembly comprises a first element spaced apart from and substantially parallel to the rigid support structure, wherein the first element comprises a member disposed on a surface and positioned to lockingly engage the rigid support structure member when the energy absorbing assembly is in a deployed configuration, and a plurality of second elements fixedly attached to the rigid support structure and the first element, the plurality of second elements having a curvilinear shape orientation in a stowed configuration and a linear configuration in the deployed configuration; and sensing an impact event or an imminence of the impact event and deploying the energy absorbing assembly, wherein the plurality of second elements extend to the linear shape orientation and force the first elements away from the rigid support structure, wherein the first element member lockingly engages the rigid support structure member.

In another embodiment, a process for operating an energy absorbing assembly comprises attaching the energy absorbing assembly to a rigid support structure, wherein the energy absorbing assembly comprises a first element spaced apart from and translatable relative to the rigid support structure, at least one second element having one end fixedly attached to the first element and an other end fixedly attached to the rigid support structure, wherein the second element is fabricated from a material adapted to release elastic energy along from a curvilinear shape orientation to a substantially straight shape orientation during deployment, and upon impact, plastically deform along a predefined buckling path from the substantially straight shape orientation; and sensing an impact event or an imminence of the impact event and deploying the energy absorbing assembly.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are energy absorbing assemblies for vehicle interior impact management that can be rapidly deployed from a stowed configuration to an expanded configuration so as to absorb kinetic energy associated with an impact of an object against an interior surface of the vehicle. The assemblies utilize a mechanical deployment mechanism to release mechanical energy in various forms along an unbuckling path. The mechanical deployment mechanism from the stowed configuration to the expanded configuration is characterized as a soft deploy that initially exhibits low modulus until the buckling configuration of the straightened structure is reached. At that point, the stiffness of the assembly increases significantly as will be described in greater detail below. The final stages of deployment take place in this high stiffness configuration, which can then be utilized to provide improved impact energy absorption.

Figure 1:
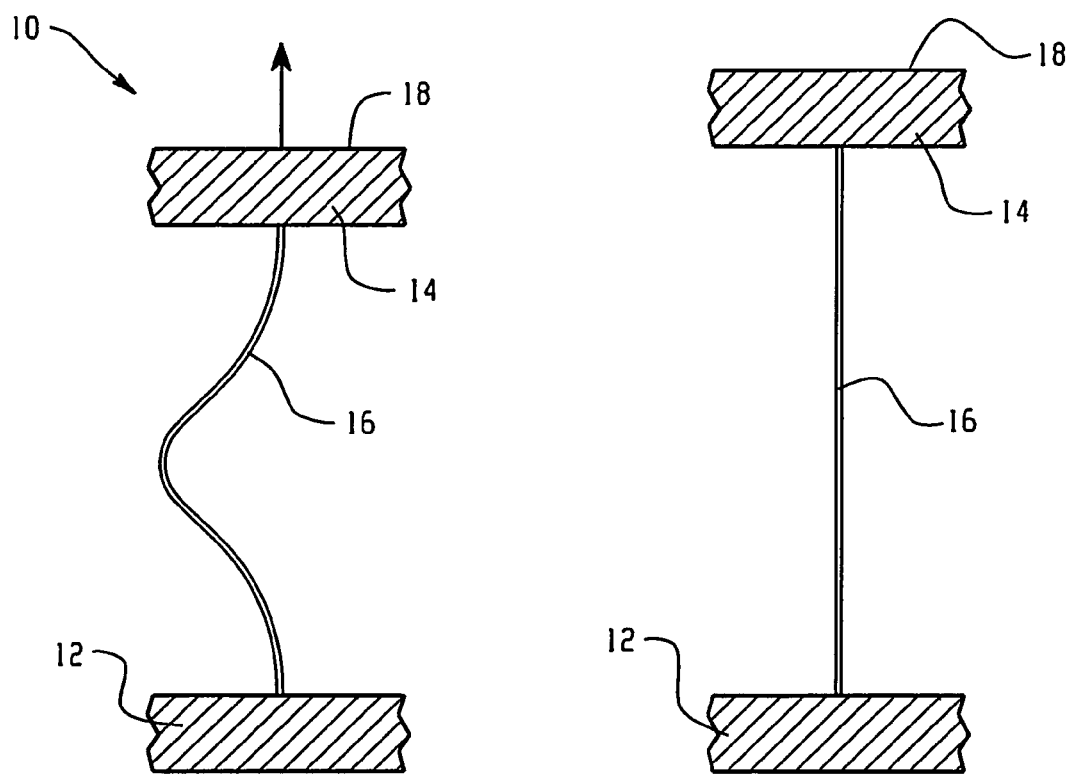
FIG. 1 is a schematic illustrating a deployable energy absorbing assembly in accordance with one embodiment.
Figure 2:
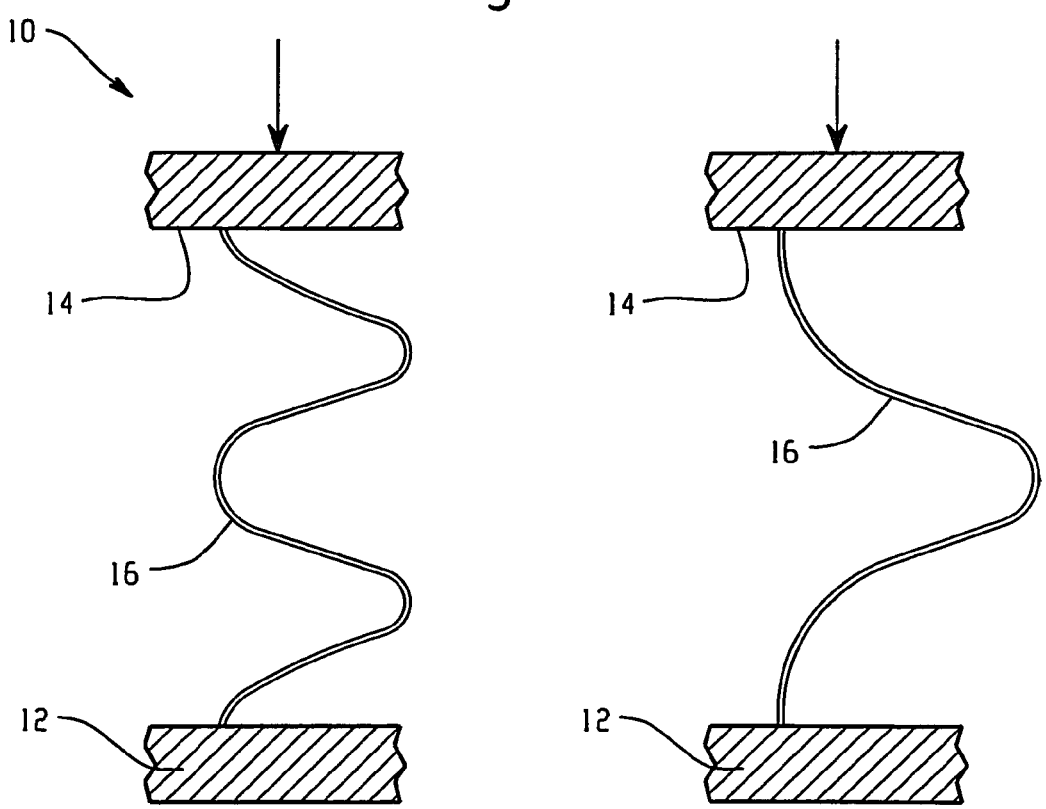
FIG. 2 is a schematic illustrating modal and bimodal buckling of an energy absorbing assembly.

FIGS. 1 and 2 illustrate an exemplary energy absorbing assembly in accordance with one embodiment. The energy absorbing assembly, generally designated 10, includes a rigid support structure 12, a movable first element 14, and a second element 16 fixedly attached to the rigid support structure and the movable first element. In one embodiment, the first element can be substantially parallel to the rigid support structure. For ease of illustration, reference will now be made herein to the situation where the first element is horizontally oriented and the second element is vertically oriented. However, it is noted that reference to the horizontal and vertical orientations are relative and that the first and second elements can be positioned at any angle with respect to ground. A covering 18 may be disposed about the assembly 10 and is adapted to accommodate the movable horizontal element 14. The covering may define, for example, an interior vehicle surface. The covering may take many forms. For example, it may be flexible and be attached at its ends to the rigid support surface in such a manner that it expands and contracts with the deployment and resetting of the energy absorbing structure in so doing defining a variable internal volume. Alternatively, it may simply be a section of material of sufficient size to cover the surface of the deployable structure (when the latter is stowed) that simply translates outward with the deploying structure and is not itself attached to the rigid support. As discussed above, the modulus properties of the vertical element 16 vary as a function of linearity, wherein modulus decreases as the vertical element modulates from a curvilinear shape orientation to a straightened shape orientation. Suitable materials for the vertical element are selected to exhibit a low modulus during the initial stages of deployment, i.e., when the vertical element is curvilinear. Once the vertical element is near or at full linear extension, the modulus properties, i.e., stiffness, of the vertical elements increases.

As shown more clearly in FIG. 2, during an impact event or upon compression of the assembly 10, the second elements, e.g., vertical elements, are configured to have a defined order of buckling mode. For example, the second elements 16 may be configured to have a low energy buckling mode, e.g., uni-modal, or a higher energy buckling mode, e.g., bimodal, trimodal, and the like. In the higher order buckling modes, the second elements are fabricated such that the modulus changes linearly along the length of each second element so that one or more constraining portions exist. In this manner, various surfaces can have variable impact energy absorption coefficients tailored to the needs of the particular surface. For example, in vehicle interior impact management, it may be desirable to have greater impact energy absorption for those surfaces prone to direct high-energy impact whereas for other surfaces it may be desired to have lower impact energy absorption such as for oblique angle impacts or low energy impacts. For comparison, FIG. 2 illustrates a uni-modal buckling mode and a bimodal buckling mode. The higher order buckling modes will require a greater force to compress, thus providing greater stiffness to the assembly upon an impact event relative to the lower order buckling modes. As such, increased energy absorption is possible, which can be tailored to the amount of impact energy anticipated.

The second elements are selected to provide the desired modulus properties described above. Suitable materials include thermoplastics, elastomers, and the like. Of these, it is preferred that shape memory polymers are employed. Shape memory polymers (SMP's) are known in the art and generally refer to a group of polymeric materials that demonstrate the ability to return to some previously defined shape when subjected to an appropriate thermal stimulus. Shape memory polymers are capable of undergoing phase transitions in which their shape orientation is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment. In this manner, the higher order modes can be defined by the hard segments. Elasticity and plasticity can be varied as a function of applied thermal signal, wherein the greatest elasticity is obtained when the thermal signal is greater than the Tg of the hard and soft segments, and wherein the greatest plasticity is obtained when the thermal signal is less than the Tg of the hard and soft segments. Moreover, buckling modality can be defined by the location of the hard segments and the application of a thermal signal greater than the Tg of the soft segment and lower than the Tg of the hard segment.

Suitable shape memory polymers can be thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly (ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Figure 3:
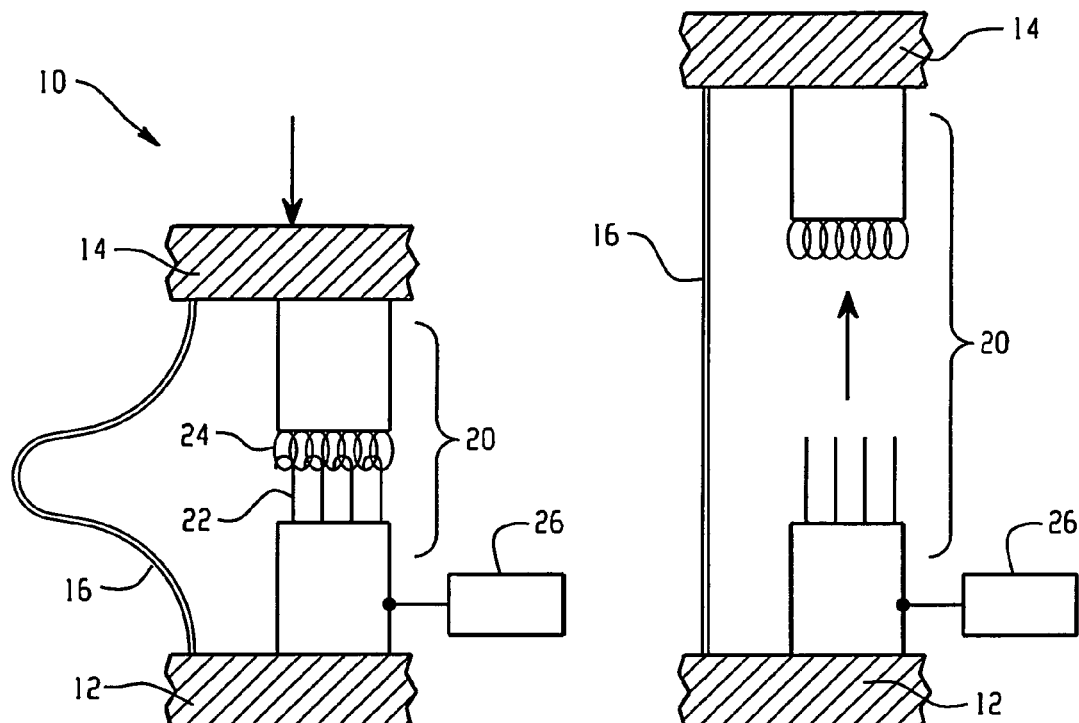
FIG. 3 is a schematic illustrating an energy absorbing assembly in accordance with a second embodiment.
Figure 4:
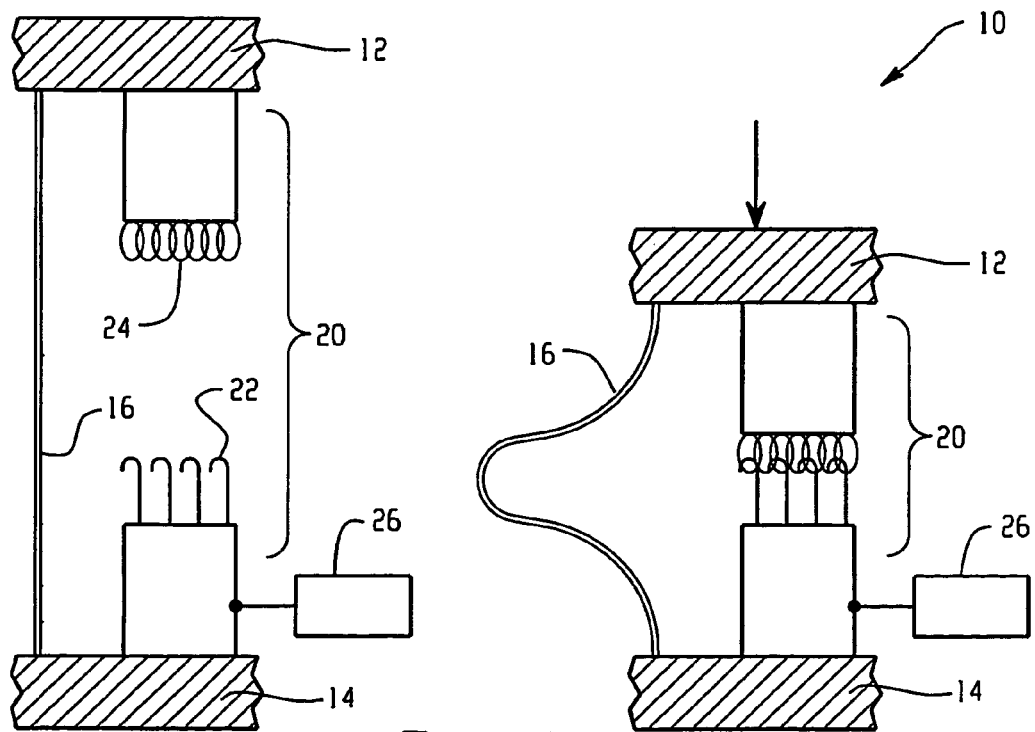
FIG. 4 is a schematic illustrating modal and bimodal buckling of an energy absorbing assembly.

In an alternative embodiment as generally shown in FIGS. 3 and 4, a smart releasable fastener 20 is utilized with energy absorbing assembly 10. The smart releasable fastener 20 is not intended to be limiting. Suitable releasable fasteners include fusible links such as melt fusible links, electromagnets, hook and loop fasteners systems, and the like. As used herein, the term "smart" refers to those releasable fasteners systems that can be selectively controlled to effect release and attachment. Reference will now be given to an exemplary hook and loop releasable fastener. The integration of other types of releasable fasteners with the energy absorbing assembly will be similar to the exemplary hook and loop fastener as will be apparent to those skilled in the art in view of this disclosure.

As shown more clearly in FIG. 3, in the stowed configuration the releasable fastener 20 is engaged such that the second elements 16 are elastically deformed. To effect release, as generally indicated by the arrow, the releasable fastener system 20 is activated and the stored elastic energy within the second elements 16 is released, thereby separating the fastener system 20 and causing the second element 16 to straighten and stiffen. In this particular embodiment, the hooks 22 of the releasable fastener are adapted to undergo a shape orientation and/or change in flexural modulus upon receipt of a suitable activation signal, resulting in disengagement. Various hook and loop smart releasable fasteners that undergo a change in shape orientation and/or flexural modulus properties are generally described in U.S. patent application Ser. No. 10/273,691 to Alan Browne et al., entitled "Releasable Fastener System", and filed on Oct. 19, 2002, incorporated herein by reference in its entirety. For example, suitable materials for fabricating the hooks 22 and/or loops 24 for providing the shape changing capability and/or change in flexural modulus include, but are not limited to, shape memory alloys, shape memory polymers, piezoelectrics, magnetostrictive materials (also referred to as magnetostrictive materials), ionic polymer metal composites, elastic memory composites, electroactive polymers and metal composites, and the like materials. An activation device 26 can be configured to deliver an activation signal to the hooks 22, wherein the activation signal may comprise a magnetic signal, an electrical signal, a heat signal, a pneumatic signal, a mechanical activation signal, a combination comprising at least one of the foregoing signals, and the like, wherein the type of activation signal employed is dependent on the particular shape changing material and/or flexural modulus changing material employed for fabricating the hook 22. For example, a magnetic and/or and electrical signal could be employed for changing the shape of hooks fabricated from magnetostrictive materials. Heat signals could be employed for causing a shape change in hooks fabricated from shape memory alloys or shape memory polymers. Electrical signals could be employed for causing a shape change in hooks fabricated from electroactive materials, piezoelectrics, electrostatics, and ionic polymer metal composite materials.

Advantageously, the energy absorbing assembly 10 in accordance with this alternative embodiment can be reversible as is shown in FIG. 4. The activation signal that effected the change in shape orientation and/or flexural modulus of the hooks 22 in the releasable fastener 20 is discontinued. As a result, the original shape orientation and/or flexural modulus properties are obtained, which upon compressing the energy absorbing assembly (i.e., elastically deforming the vertical elements), will cause reattachment of the hooks 22 with the loop material 24.

Figure 5:
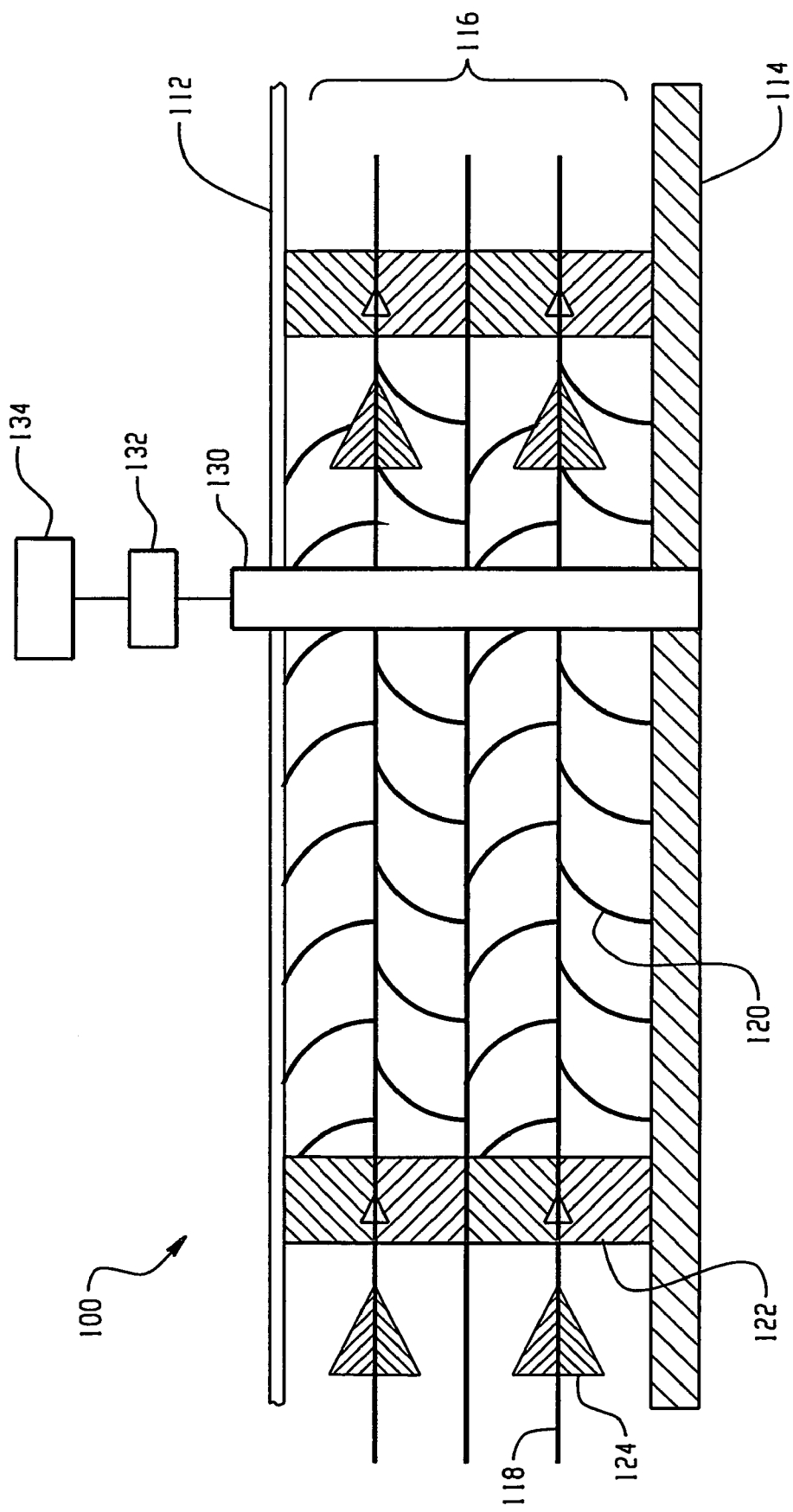
FIG. 5 is a schematic illustrating an energy absorbing assembly in a stowed configuration in accordance with a third embodiment.
Figure 6:
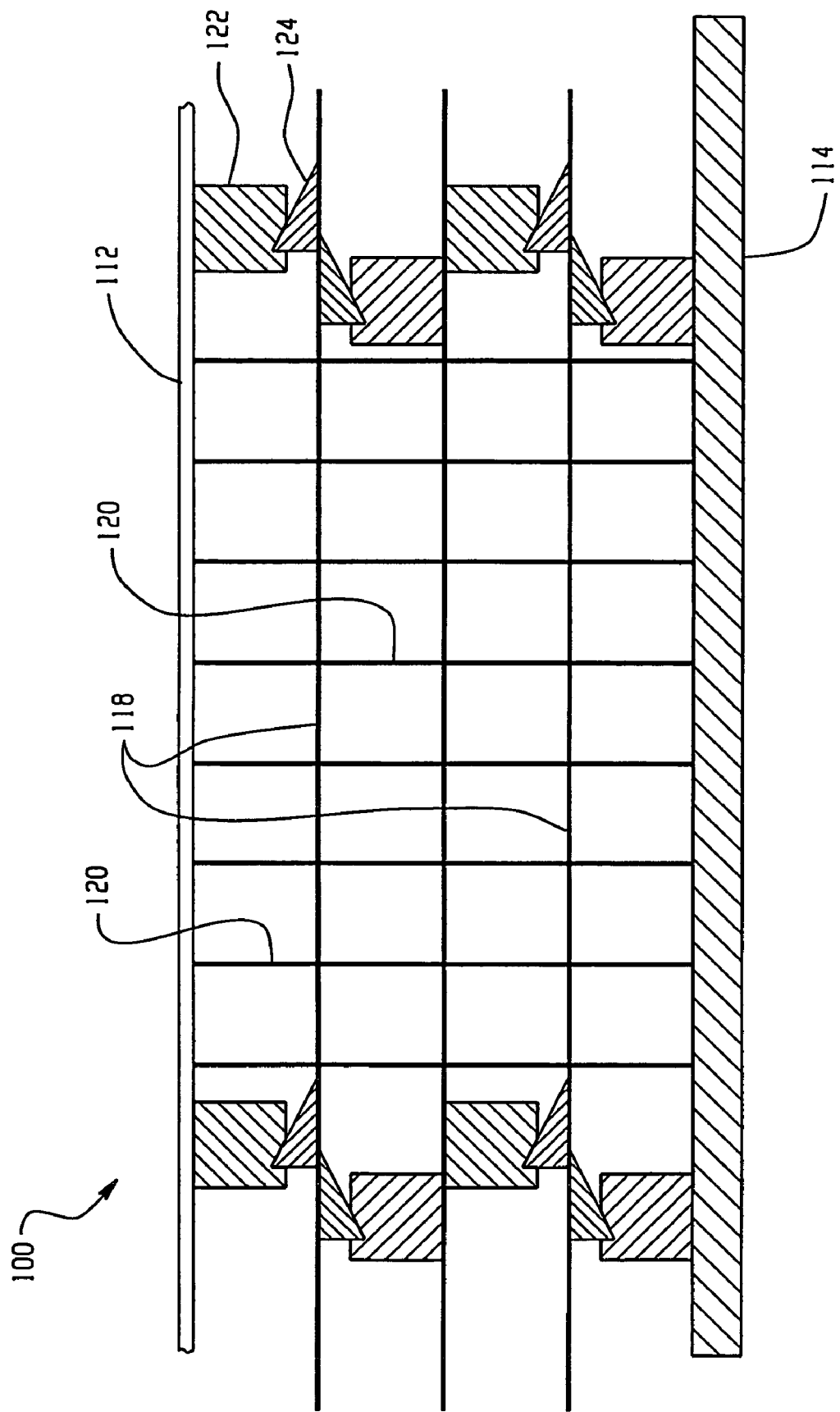
FIG. 6 is a schematic illustrating the energy absorbing assembly of FIG. 5 in an expanded configuration.
Figure 7:
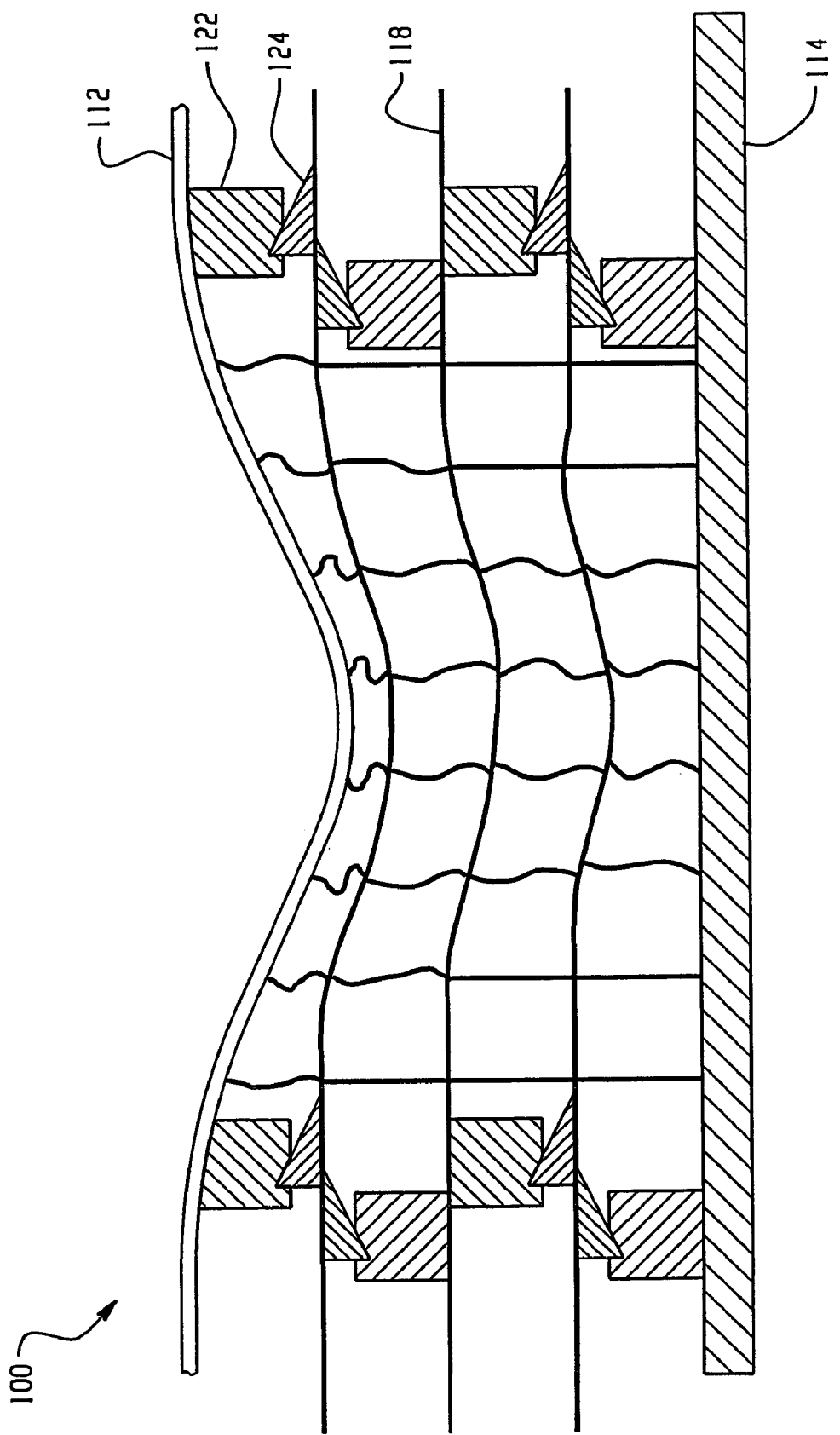
FIG. 7 is a schematic illustrating the energy absorbing assembly of FIG. 5 after an impact event.

As shown in FIGS. 5–7, an energy absorbing assembly in accordance with another embodiment comprises a lattice network of first (horizontal) and second (vertical) elements and is generally indicated by reference numeral 100. FIG. 5 illustrates the assembly in a stowed configuration; FIG. 6 illustrates the assembly in a deployed configuration; and FIG. 7 illustrates the deployed assembly after an impact event. Advantageously, the assembly 100 absorbs the kinetic energy associated with an impact event and is suitable for use in vehicle interior impact management. The stowed configuration of FIG. 5 utilizes elastic energy stored within second elements 120 in the manner previously described. Once fully deployed, subsequent deformation of the assembly 100 is plastic, which maximizes the amount of impact energy absorbed. Moreover, the assembly is configured to resist lateral movement upon deployment, thereby providing maximum energy absorption from impacts at oblique angles as well as direct impacts.

The energy absorbing assembly 100 generally comprises a covering 112 that may or may not be flexible and may or may not be attached to a rigid support structure 114 depending on the intended application. If flexible, the covering 112 and the rigid support structure 114 define an expandable interior region 116. Within the expandable interior region 116, there is shown a plurality of spaced apart horizontal elements 118. The horizontal elements 118 are oriented substantially parallel to the rigid support structure 114 and are spaced apart by a plurality of second elements 120 fixedly attached thereto. In the stowed configuration as shown in FIG. 5, the second support elements 120 are elastically deformed by compressive means of the assembly, which provides a uni-directional curvilinear shape for each layer of vertical elements. To accomplish this, the first elements 118 move substantially laterally as compressive forces are applied resulting in elastic energy stored in the second elements 120. In contrast, when deployed (see FIG. 6), the second elements 120 release the stored elastic energy and move the various first elements 118 upwards and substantially laterally relative to the rigid support structure 114. In the deployed configuration, the second elements 120 are substantially perpendicular to the rigid support structure 114. Moreover, the material for fabricating the second elements is selected to provide increased modulus upon full linear extension.

One surface 122 of the first element 118 is provided with at least one protruding element 124 (i.e., the first element member) whereas an opposing surface 126 of an adjacent first element is provided with at least one cavity element 128 (i.e., additional first element member), which is adapted to lockingly receive a portion of the protruding element 124. In this manner, when fully expanded, the protruding element 124 and the cavity element 128 align and become lockingly engaged. Once lockingly engaged, lateral movement of the deployed assembly 100 is prevented and a higher-order mode of force is necessary to deform the assembly. In this embodiment, a permanent deformation occurs upon absorption of impact energy as shown in FIG. 7.

The energy absorbing assembly 100 further comprises a sensor 132 and a controller 134 in operative communication with a locking mechanism 130 utilized to maintain the assembly in its stowed configuration. The locking mechanism 130 is not intended to be limited and may comprise any means. For example, the locking mechanism may be a mechanically actuated latch or the like. The sensor 132 is preferably configured to provide pre-impact information to the controller 134, which then releases the locking mechanism 130 to deploy the energy absorbing assembly 100 under pre-programmed conditions defined by an algorithm or the like. In this manner, the assembly 100 can be used to anticipate an event such as an impact with an object and provide absorption of the kinetic energy associated with an object within the vehicle as a result of the impact. The illustrated energy absorbing assembly 100 is exemplary only and is not intended to be limited to any particular shape, size, configuration, or the like.

In one embodiment the covering 18 or 112 is preferably fabricated from a material that is elastic (flexible) to the limits of the assembly expansion so that it can return to its original geometry, if the assembly is configured to be reversible. As such, suitable materials include fabrics, elastomers such as styrene butadiene rubber, polyurethanes, polyisoprene, neoprene, chlorosulfonated polystyrenes, and the like. Other materials suitable for use as the flexible cover 18 or 112 will be apparent to those skilled in the art in view of this disclosure. Preferably, the material chosen for the flexible cover accommodates strains of at least about 50%, with strains of about 100% more preferred, and strains of about 200 to about 400 percent most preferred. In a second embodiment the covering can be simply a section of material of sufficient size to cover the surface of the deployable structure when stowed which cover simply translates outward with the deploying structure and itself is not attached to the rigid support. In this embodiment the covering need be sufficiently flexible to accommodate only small strains of a few percent. The covering 18 or 112 can be decoratively patterned or, optionally, an outer decorative covering (not shown) can be provided in sliding engagement over the covering, e.g., a stretchable fabric or the like.

The rigid support structure 14 or 114 is preferably a stationary support for an interior surface of a vehicle. The various energy absorbing assemblies described herein can be used to replace conventional padded interior surfaces in a vehicle or may be targeted specifically to address those interior surfaces addressed in various government standards. For example, the energy absorbing assemblies can be used for the door pillars, the header, the door interiors, the dashboard, the sun visors, the armrests, the knee bolsters, and other areas such as under the carpet on the vehicle floor, in the headrest of the seat, the seat itself, the seat backs, center consoles, roof rails, or like surfaces where absorption of kinetic energy caused by impact of an occupant against the surface is desired and/or where proper positioning of an occupant or object is desired during an impact event. For example, locating the energy absorbing assembly under the carpet can be used to assist the positioning of an occupant's knees with respect to the knee bolster. In the seat area, the energy absorbing assembly can be strategically positioned to provide stiffening at an edge of the seat to provide anti-submarining properties and help keep an occupant from sliding forward in the event of an impact. Other areas of the vehicle, such as the door pillars, can provide energy absorption properties to the occupant in the event of the impact, thereby decreasing the forces associated with an impact to the occupant.

As previously discussed, the second elements 16, 120 are fabricated from a material that has variable elasticity to permit the necessary compressive forces to stow the assembly 10, yet provide plastic deformation once deployed into the substantially perpendicular orientation previously described. The material is selected such that the buckling modality can be defined within the material as may be desired for various applications.

The energy absorbing assemblies 10, 100 can be applied to any rigid support structure wherein it is desired to provide a kinetic energy reduction associated wit an occupant and/or an object impacting the support structure and/or for proper positioning of an occupant. As such, the system is extremely versatile. Because of the short expansion times, this type of energy absorbing assembly is particularly well suited for use with crash detection systems using crash detection means plus algorithms to trigger deployment, i.e., systems similar to that used in conventional airbag restraint systems. Exemplary crash detection means include systems employing crash sensors and/or pre-crash sensors. It is also suited especially in its resettable embodiments for use with pre-crash sensor systems that are reasonably robust in their ability to correctly identify when a crash is indeed imminent.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A reversibly deployable energy absorbing assembly, comprising:
    a mechanical deployment mechanism comprising:
    a first element in contact with a flexible covering, wherein the flexible covering includes a surface facing a vehicle interior;
    a rigid support structure, wherein the first element is translatable relative to the rigid support structure, and wherein the first element is spaced apart from and substantially parallel to the rigid support structure;
    at least one second element having one end fixedly attached to the first element and an other end fixedly attached to the rigid support structure, wherein the second element is fabricated from a material adapted to release elastic energy along an unbuckling path from a curvilinear shape orientation to a substantially straight shape orientation during expansion, and upon compression, a selected one of a single modal and a multi-modal buckling path from the substantially straight shape orientation to the curvilinear shape orientation; and
    a releasable locking mechanism in operative communication with the first element and the rigid support structure.

2. The energy absorbing assembly of claim 1, wherein the at least one second element is a shape memory polymer.

3. The energy absorbing assembly of claim 2, wherein the shape memory polymer comprises at least one of polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, and styrene-butadiene-styrene block copolymers.

4. The energy absorbing assembly of claim 1, wherein the rigid support structure comprises at least one of a vehicle door pillar, a vehicle header, a vehicle door interior, a vehicle dashboard, a sun visor, an armrest, a vehicle knee bolster, a vehicle floor, a vehicle headrest, a vehicle seat, a center console, a roof rail, and a vehicle seat back.

5. The energy absorbing assembly of claim 1, further comprising a crash sensor and/or a pre-crash sensor in electrical communication with a controller, wherein the controller is in operative communication with the assembly.

6. The energy absorbing assembly of claim 1, further comprising a releasable fastener system in combination with the energy absorbing assembly, wherein the releasable fastener system is a hook and loop fastener mechanism, wherein the releasable fastener system is in operative communication with a controller and a sensor.

7. An energy absorbing assembly, comprising:
a rigid support structure;
a first element spaced apart from and substantially parallel to the rigid support structure,
a plurality of second elements fixedly attached to the rigid support structure and the first element, wherein the plurality of second elements are substantially perpendicular to the first element and the rigid support structure when in a deployed configuration and a curvilinear shape orientation in a stowed configuration and
wherein the first element member and the rigid support structure member comprise releasable locking means with one another for providing the stowed and deployed configurations.

8. The energy absorbing assembly of claim 7, further comprising:
at least one additional first element spaced apart from and parallel to the first element, is adapted to lockingly engage the first element in the deployed configuration; and
a plurality of additional second elements fixedly attached to the first element and the at least one additional first element, wherein the plurality of additional second elements have the curvilinear shape orientation in the stowed configuration and are substantially perpendicular to the first element and the at least one additional element when in in the deployed configuration.

9. The energy absorbing assembly of claim 8, wherein the second elements are comprised of a shape memory polymer.

10. The energy absorbing assembly of claim 9, wherein the shape memory polymer comprises polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, or copolymers thereof.

11. The energy absorbing assembly of claim 7, wherein the rigid support structure comprises one of a vehicle door pillar, a vehicle header, a vehicle door interior, a vehicle dashboard, a sun visor, an armrest, a vehicle knee bolster, a vehicle floor, a vehicle headrest, a vehicle seat, a center console, a roof rail, or a vehicle seat back.

12. The energy absorbing assembly of claim 7, further comprising a crash sensor and/or a pre-crash sensor in electrical communication with a controller, wherein the controller is in operative communication with the assembly.

13. The energy absorbing assembly of claim 7, further comprising a covering on the assembly.

14. A process of operating an energy absorbing assembly, comprising:
attaching the energy absorbing assembly to a rigid support structure, wherein the energy absorbing assembly consists essentially of a mechanical deployment mechanism comprising a first element spaced apart from and translatable relative to the rigid support structure, at least one second element having one end fixedly attached to the first element and an other end fixedly attached to the rigid support structure, wherein the first element is in contact with a flexible covering, wherein the flexible covering includes a surface facing a vehicle interior, wherein the second element is fabricated from a material adapted to release elastic energy along from a curvilinear shape orientation to a substantially straight shape orientation during deployment, and upon impact, plastically deform along a predefined buckling path from the substantially straight shape orientation; and
sensing an impact event or an imminence of the impact event and deploying the energy absorbing assembly.

15. The process of operating the energy absorbing assembly of claim 14, wherein the predefined buckling path is multi-modal.

16. The process of operating the energy absorbing assembly of claim 14, wherein the predefined buckling path is uni-modal.

17. The process of operating the energy absorbing assembly of claim 14, wherein the at least second element comprises a shape memory polymer.

18. The process of operating the energy absorbing assembly of claim 14, wherein the rigid support structure comprises one of a vehicle door pillar, a vehicle header, a vehicle door interior, a vehicle dashboard, a sun visor, an armrest, a vehicle knee bolster, a vehicle floor, a vehicle headrest, a vehicle seat, a center console, a roof rail, and a vehicle seat back.

* * * * *